United States Patent
Jaeger

(10) Patent No.: US 11,808,343 B2
(45) Date of Patent: Nov. 7, 2023

(54) FAN COVER ASSEMBLY FOR A GEARBOX, METHOD FOR PRODUCING SAME, ASSEMBLY AND A MODULAR SET

(71) Applicant: Dana Motion Systems Deutschland GmbH, Bad Homburg (DE)

(72) Inventor: Tim Steffen Jaeger, Bad Homburg (DE)

(73) Assignee: DANA MOTION SYSTEMS DEUTSCHLAND GMBH, Bad Homburg (DE)

( * ) Notice: Subject to any disclaimer, the term of this patent is extended or adjusted under 35 U.S.C. 154(b) by 0 days.

(21) Appl. No.: 17/806,885

(22) Filed: Jun. 14, 2022

(65) Prior Publication Data

US 2022/0397190 A1 Dec. 15, 2022

(30) Foreign Application Priority Data

Jun. 15, 2021 (DE) ...................... 10 2021 206 105.2

(51) Int. Cl.
*F16H 57/04* (2010.01)
*F16H 57/02* (2012.01)
*F16H 57/031* (2012.01)

(52) U.S. Cl.
CPC ....... *F16H 57/0416* (2013.01); *F16H 57/031* (2013.01)

(58) Field of Classification Search
CPC . F16H 57/031; F16H 57/0415; F16H 57/0416
See application file for complete search history.

(56) References Cited

U.S. PATENT DOCUMENTS

| | | | | |
|---|---|---|---|---|
| 9,366,332 | B2 * | 6/2016 | Hayashi | F16H 57/0416 |
| 9,599,406 | B2 * | 3/2017 | Tietyen | F28D 1/0383 |
| 9,951,859 | B2 * | 4/2018 | Becka | F16H 57/031 |
| 10,578,205 | B2 * | 3/2020 | Rakuff | H02K 9/14 |
| 11,536,362 | B2 * | 12/2022 | Kunik | F16H 57/031 |

FOREIGN PATENT DOCUMENTS

| | | | | |
|---|---|---|---|---|
| CN | 203394862 U | * | 1/2014 | |
| DE | 102005031197 A1 | * | 1/2007 | F04D 29/329 |
| DE | 102005031197 A1 | | 1/2007 | |
| DE | 102012000682 A1 | * | 7/2013 | F04D 29/36 |
| DE | 102008010912 B4 | * | 11/2020 | F04D 29/281 |
| WO | WO-2009124687 A1 | * | 10/2009 | F16H 57/031 |
| WO | WO-2014155452 A1 | * | 10/2014 | F16H 57/0416 |

OTHER PUBLICATIONS

Machine translation of CN 203394862 U obtained on Jan. 4, 2023.*
Machine translation of WO 2009/124687 A1 obtained on Jan. 4, 2023.*

* cited by examiner

*Primary Examiner* — Adam D Rogers
(74) *Attorney, Agent, or Firm* — McCoy Russell LLP

(57) ABSTRACT

Disclosed are a fan cover assembly for a gearbox, a method for producing same, an assembly and a modular set, the gearbox having a rotatable shaft and a fan mounted on the rotatable shaft, the fan cover assembly comprising:
a fan cover with a first aperture for receiving the rotatable shaft and
a shielding member with a second aperture for receiving the fan cover
wherein the fan cover is arrangeable in the second aperture with at least a first orientation defining a first position of the first aperture relative to the shielding member and with a second orientation defining a second position of the first aperture relative to the shielding member.

12 Claims, 3 Drawing Sheets

FAN COVER ASSEMBLY FOR A GEARBOX, METHOD FOR PRODUCING SAME, ASSEMBLY AND A MODULAR SET

CROSS REFERENCE TO PRIORITY APPLICATION

The present application claims priority to German Patent Application No. 10 2021 206 105.2, entitled "FAN COVER ASSEMBLY FOR A GEARBOX, METHOD FOR PRODUCING SAME, ASSEMBLY AND A MODULAR SET", and filed on Jun. 15, 2021. The entire contents of the above-listed application is hereby incorporated by reference for all purposes.

TECHNICAL FIELD

The present document relates to a fan cover assembly for a gearbox, such as an industrial gearbox, and a method for producing same. Further, an assembly and modular set are disclosed.

BACKGROUND AND SUMMARY

It is known to provide a rotatable shaft of a gearbox with a fan to create a cooling airflow around the gearbox. The fan is thus typically placed at a portion of the shaft that extends out of the gearbox housing and into the surroundings. That is, the fan is placed at an outside of the housing. The shaft and fan rotate jointly, thereby creating the airflow.

It is further known to provide a protective cover or shield (herein referred to as a shielding member) that at least partially houses and/or surrounds the fan. These may equally be placed at an outside of the gearbox e.g. so that the rotatable shaft extends through them to connect to an adjacent device. Such shielding members prevent foreign objects from contacting and/or being dragged in by the rotating fan.

One example of a prior art fan cover assembly can be found in DE 10 2005 031197 A1.

It has been determined that providing such shielding members so far is a significant expense factor that increases the cost of the overall gearbox unit.

Therefore, an object of this disclosure is to reduce the costs of fan-cooled gearboxes and in particular industrial gearboxes.

This object is solved by the subject matter of the attached independent claims. Advantageous embodiments are described below and are defined in the dependent claims.

Accordingly, a fan cover assembly for a gearbox (or, differently put, a transmission) is provided, the gearbox having a rotatable shaft and a fan mounted on the rotatable shaft, the assembly comprising:
- a fan cover with a first aperture for receiving the rotatable shaft; and
- a shielding member (or, differently put, a fan hood) with a second aperture for receiving the fan cover;
- wherein the fan cover is arrangeable in the second aperture with at least a first orientation defining a first position of the first aperture relative to the shielding member and with a second orientation defining a second (different) position of the first aperture relative to the shielding member.

According to this disclosure, it has been determined that a reason for the high costs associated with existing shielding members is that these need to be adapted for each specific type of gearbox. For example, individual cutouts need to be provided which match a given position of the rotatable shaft to which the fan is attached. However, with each type of gearbox, this position may change.

Similarly, the shapes and/or dimensions of shielding members may have to be adjusted depending on the shapes and/or dimensions of each gearbox housing. This is valid, for example, when the shielding member is supposed to be fixed to the gearbox housing at defined positions or is supposed to surround a portion of the gearbox housing (e.g. different sides thereof) to a defined extend. With every variation of the gearbox housing, the locations of said fixing positions as well as the portions to be surrounded may change, requiring costly adaptions of the shielding member.

With the fan cover assembly disclosed herein, such problems are overcome as one and the same fan cover assembly may be used for a number of gearboxes whose shaft-positions vary from one another. For example, on the same fan cover assembly may be mounted to a gearbox with a shaft (to which a fan is mounted) located at a first position and to a further gearbox, with the shaft being located at a second position. For doing so, it is sufficient to adjust the orientation of the fan cover. Additionally or alternatively, it may suffice to adjust the shielding member e.g. to varying dimensions of a gearbox housing, but to use on the same fan cover for a number of different gearboxes and gearbox housings.

The rotatable shaft may be an input shaft. The fan may rotate jointly with the shaft, thereby creating an airflow. The fan may be disposed a portion of the shaft extending out of the gearbox housing, e.g. so that a driven component may be attached thereto.

The first aperture may be a cut-out and/or a through hole and/or may have a circular shape. Apart from said first aperture, the fan cover may comprise further and/or smaller apertures or vents through which air can be dragged or sucked in by the fan. These may be disposed around the first aperture. For example, the fan cover may comprise a grid-like arrangement of vents, wherein the first aperture may be located at a center of this arrangement.

The second aperture may be larger than the first aperture and/or may have a different shape (e.g. non-circular). For example, it may match an outline of the fan cover and may e.g. be rectangular or polygonal.

The fan cover may be plate-shaped and/or planar. The shielding member may be planar or non-planar e.g. comprise angled portions as detailed below. Any of the fan cover and shielding member may comprise or be made of a metallic material.

For adjusting its orientation, the fan cover may be rotated or flipped e.g. so that a side thereof which faces the gearbox housing and/or the surroundings changes. For example, when assuming the first orientation, a first face of the fan cover may face the gearbox housing (and a second face may face the surroundings), whereas in the second orientation said first face may face the surrounding (and the second face may face the gearbox housing). Said first and second face made from different sides of the usually plate-shaped fan cover.

The first aperture may be offset from (i.e., is at a distance to) a geometric center of the fan cover. This allows for changing a position of the first aperture by e.g. rotating or flipping the fan cover in the manner explained above.

According to an embodiment, a distance between the first and second position of the first aperture is at least 5 cm, at least 10 cm or at least 20 cm. In one example, said distance may be between 5 cm and 50 cm or between 5 cm and 30 cm. It has been determined that this enables using the fan cover for a number of gearboxes having varying shaft and thus fan positions.

Generally, any of the fan cover and shielding member may be a one-piece member. It is, however, also possible that at least one of these members is a multi-piece member.

For example, the fan cover may comprise at least two fan cover parts that are connectable to one another. The fan cover parts may split the fan cover in half and/or each confine half the outline of the first aperture. Generally, when the at least two fan cover parts are connected to one another, each fan cover part may confine at least a section of the first aperture or, differently put, of the first the aperture's outline or circumference.

For connecting the fan cover parts, predetermined connection sections may be provided at each fan cover part. These may e.g. be disposed at or comprise at least one edge portion of each fan cover part. The connection sections may be brought into abutment and/or overlap with one another, thereby defining a joint such as a linear and/or elongated joint. The connection sections may be fixed to one another by means of at least one fixing element, such as a bolt or rivet. Summarizing the above, the fan cover parts may be connectable to one another along an elongated and typically linear first joint.

Additionally or alternatively, the shielding member may comprise at least two shielding parts that are connectable to one another, in particular wherein when the at least two shielding parts are connected to one another each shielding part confines at least a section of the second aperture (e.g. of its outline or circumference). The two shielding parts may each confine half of the second aperture. They may have different shapes and/or dimensions, e.g. due to the sides of the gearbox housing along which the shielding parts extend and/or to which said shielding parts are connected being different from one another.

Similar to the fan cover parts, for connecting the shielding parts, these may comprise dedicated connecting sections (e.g. at or forming edge portions of a shielding part). These sections may be brought into abutment and/or overlap with one another. The shielding parts may be fixed to one another by means of mechanical elements, such as screws or rivets.

The shielding parts may be connectable to one another along an elongated and usually linear second joint. By providing respective fan cover parts and/or shielding parts, these parts may be selected, varied and individually combined so as to provide a fan cover assembly that is adapted for a given specific gearbox. This way, a range of different fan cover assemblies may be flexibly configured from a limited number of fan cover parts and/or shielding parts. This can help to reduce costs compared to producing a complete individual fan cover assembly for each single type of gearbox.

Further, by providing a respective multi-part design of the fan cover assembly, it may be sufficient during repair and maintenance to only remove single parts of said assembly, e.g. to be able to reach the fan. This may reduce time and effort during maintenance and repair.

By providing elongated and/or linear joints along which the shielding parts and/or cover parts are connected, connecting the parts is simplified e.g. compared to joints having complex or angled shapes.

The first joint (of the fan cover parts) and second joint (of shielding parts) may be aligned with one another when the fan cover is arranged in the second aperture with any of the first and second orientation.

In one example and as indicated above, the fan cover is rotatable (or flappable) about an axis of rotation for changing between the first and second orientation and wherein the fan cover has a plurality fixing portions that are rotation-symmetrically arranged with respect to said axis of rotation. For example, the axis of rotation may extend orthogonal to and/or intersect a plane of the fan cover. Differently put, the shielding member may have a planar portion delimiting the second aperture and the axis of rotation is arranged perpendicular to the planar portion of the shielding member, e.g. at least when the fan cover is received in the second aperture of the shielding member.

The rotation-symmetry may relate to rotations by defined angles, e.g. 90° or 180°, but not by random angles. When rotating the fan cover accordingly, each fixing portion may be positioned at a locations, where q fixing portion had previously been positioned when assuming the previous orientation. This means that the assembly process of the fan cover and/or the shielding member does not have to be adjusted as the fixing portions maintain predetermined and expected positions independently of an orientation of the fan cover.

The fixing portions may e.g. be portions predetermined and/or positioned and/or structurally configured for producing a connection and/or a mechanical fixation between the fan cover and shielding member. In one example, the fixing portions comprise or are configured as through holes for e.g. receiving rivets, bolts or screws.

The fan cover and shielding member may be mechanically fixed to one another. Again, for doing so, they may comprise dedicated connection sections (e.g. at or comprising edge portions of the fan cover or shielding member) that may be brought into abutment and/or overlap with one another. The above fixing portions may be provided in said connection sections.

The shielding member may also have a plurality of fixing portions (e.g. in the above connection sections) that are configured to be aligned with the fixing portions of the fan cover in both orientations of said fan cover. This means that independently of the orientation of the fan cover, fixing portions (e.g. through holes) in the shielding member and fan cover can be brought into alignment, so that and assembly process does not have to be adjusted based on the fan cover's orientation.

By providing any of the typically abutting or overlapping connection sections discussed herein, assembly of the single parts and members is simplified.

The shielding member and fan cover may (at least sectionally) both be planar or plate-shaped. They may at least sectionally define a planar or plate-shaped assembly when the cover is received in the shielding member, e.g. a planar (front) face of the assembly. This provides a compact design.

The disclosure also concerns a modular set for producing a fan cover assembly according any of the aspects disclosed herein. The modular set comprises at least one of:
  at least a first shielding member and a second shielding member; or
  a plurality of shielding parts (e.g. three or more) which are combinable to provide at least a first shielding member and a second shielding member, each combination including at least selected ones (e.g. only two and/or less than the number of shielding parts).

The first shielding member and second shielding member may have different shapes and/or dimensions and the arrangement may further comprise a fan cover that is arrangeable in the first shielding member to provide a fan cover assembly according to a first configuration, and that is arrangeable in the second shielding member to provide a fan cover assembly according to a second configuration.

Accordingly, the modular set may allow for configuring different shielding members by e.g. selecting and combining specific shielding parts or certain shielding members out of a plurality of e.g. preconfigured or one-piece shielding members. One and the same fan cover may be disposed in the respectively configured or selected shielding members to produce fan assemblies according to different configurations. The number of possible configurations is further be increased by the plurality of orientations with which the fan cover can be arranged within the shielding member.

The presently proposed subject matter also relates to a product line with a first gearbox to which a fan cover assembly according to a first configuration is mounted and a second gearbox switch a fan cover assembly according to a second configuration is mounted. The gearboxes may differ from one another with regard to the gearbox housing (e.g. its shape and/or dimensions) and/or with regard to a position of the rotatable shaft to which the fan is mounted. The fan cover assemblies according to be first and second configuration may be different from one another and may correspond to the first and second configuration discussed above. The first and second configuration may each be produced from a similar or the same modular set, e.g. the modular set discussed above.

The presently proposed subject matter also relates to a method for producing a fan cover assembly according to one of the aspects disclosed herein, the method comprising:
  providing a fan cover with a first aperture for receiving the rotatable shaft;
  providing a shielding member with a second aperture for receiving the fan cover; and
  arranging the fan cover in the second aperture with one out of a plurality of possible orientations with which the fan cover is arrangeable in the second aperture, the orientation e.g. being selected depending on a position of the rotatable shaft to which the fan mounted.
  Providing the shielding member may comprise:
  selecting one out of at least a first shielding member and a second shielding member; or
  combining at least selected ones out of a plurality of shielding parts to provide one of at least a first shielding member and a second shielding member, the first and second shielding member being producible from combinations of said shielding parts;
  wherein the first and second shielding member have different shapes and/or dimensions.

Further, the presently proposed subject matter relates to an assembly, comprising:
  a gearbox housing that is configured to receive a rotatable shaft with a fan mounted on the rotatable shaft; and
  a fan cover assembly according to one of the aspects disclosed herein that is coupled to (e.g. fixed at) the gearbox housing;
  wherein the shielding member of the fan cover assembly comprises at least a first section and a second section that extend along different sides of the gearbox housing.

The sections of the shielding member may be arranged at a distance to the gearbox. This way, gaps or channels may be defined through which part of the airflow can be guided that is generated by the fan. Thus, the airflow can be directed along predetermined portions of the gearbox housing e.g. to locally increase cooling.

The sections may extend at an angle and e.g. orthogonal to one another. There may be at least one pair of sections that extend parallel to one another as well as at an angle to a further section. This way, the third section may e.g. extend along a (front) face of the gearbox at which the shaft and fan are arranged while the pair of sections extends along a top and bottom face or along parallel side faces of the gearbox.

The sides of the gearbox along which the sections extend may e.g. be a side at which the shaft and fan are arranged (e.g. a front side) and a side extending at an angle and usually substantially orthogonally thereto (e.g. a top and/or bottom side or a side face). In one example, at least one of the sides is near a gear stage, e.g. a first or input gear stage which is directly driven by the shaft. For example, a cog mounted at the shaft may be part of said gear stage. The side may cover said gear stage or be adjacent thereto (e.g. at a distance of less than 10 cm and/or without any further gear stages mounted in between). When the shielding member extends in this manner, part of the airflow that is generated by the fan can be guided by the shielding member along said side. Thus, cooling is locally increased. This is particularly advantageous as the first gear stage represents a main heat source of the gearbox.

According to a further aspect of the assembly, the gearbox housing comprises a first predetermined section for receiving the input shaft to provide a first configuration of the assembly; and a second predetermined section for receiving the input shaft to provide a second configuration of the assembly,
  wherein the second aperture of the shielding member covers (or includes or encloses) an area of the gearbox housing including both of the first and second predetermined section. Thus, the same shielding member can be used regardless of the position of input shaft.

The gearbox housing may be structurally adjusted or prepared to receive the shaft in or at the first and second predetermined section. For example, at least one of the first and second predetermined section may comprise throughholes or locally weakened section (e.g. having a locally reduced material strength by e.g. at least 30%) which may both be produced by casting. By means of the weakened sections, through-holes may easily be produced depending on the desired shaft position. If both predetermined sections comprise through-holes, an unused one can be covered or filled e.g. after casting the gearbox housing. Further, the fact that a section is predetermined for receiving an input shaft may be evident from e.g. bearing or sealing seats that are pre-casted in its vicinity (e.g. at its inner face in the gearbox housing). These bearings or seals may interact with an inserted portion of the rotatable shaft.

Embodiments of the of the presently proposed subject matter are discussed below with reference to the attached schematic figures.

DETAILED DESCRIPTION

Figure 1:
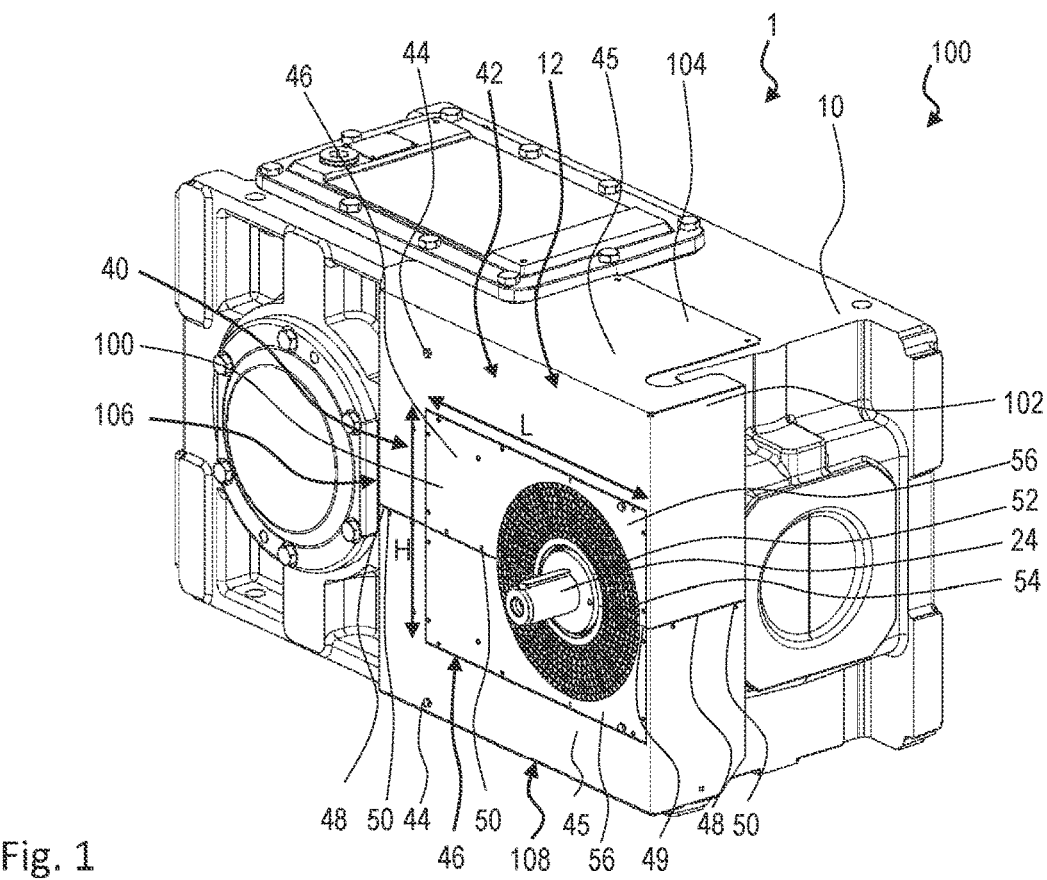
FIG. 1 shows a fan cover assembly mounted to a gearbox according to a first embodiment.

A gearbox 1 comprising a gearbox housing 10 to which a fan cover assembly 12 is attached is shown in FIG. 1. The gearbox housing 10 and fan cover assembly 12 form an assembly 100 according to an embodiment of this disclosure. The gearbox 1 is an industrial gearbox whose inner components (e.g. inner gear stages) are not visible in FIG. 1.

Figure 2:
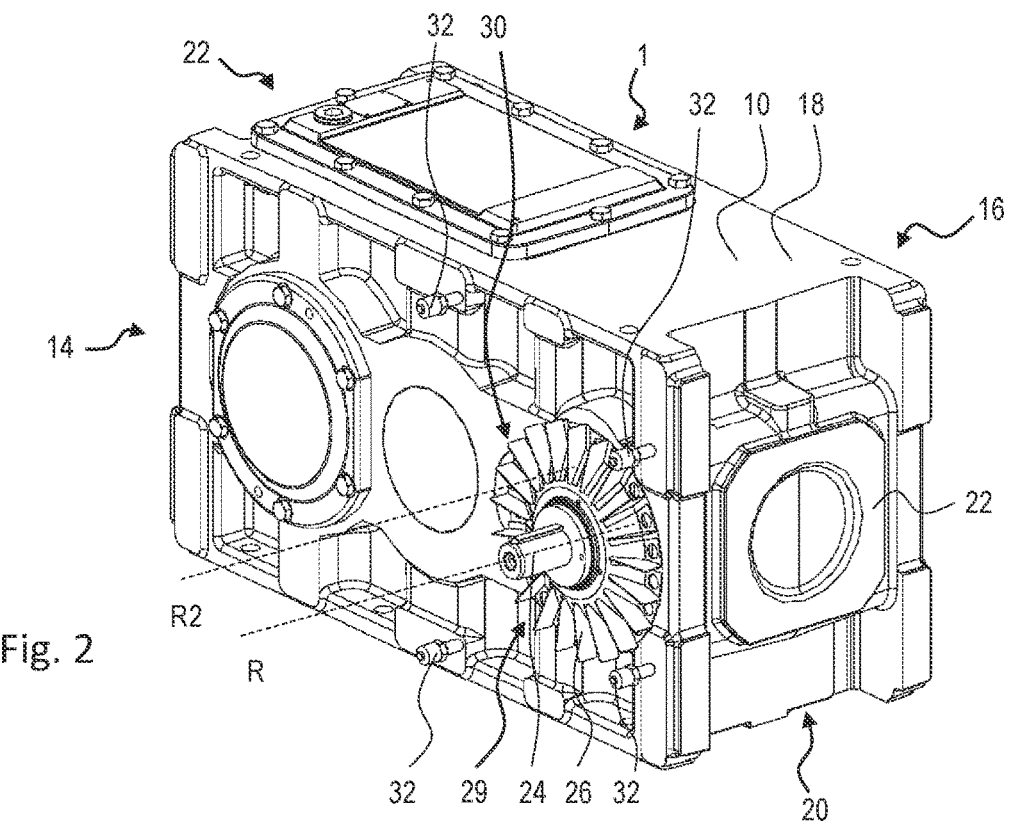
FIG. 2 shows the gearbox of FIG. 1 with the fan cover assembly being removed.

FIG. 2 depicts the gearbox 1 of FIG. 1 with the fan cover assembly 12 being removed. In the following, both of FIGS. 1 and 2 are discussed simultaneously, while some reference signs may be included in only one of said figures but equally apply to the other one. In both FIGS. 1 and 2, a vertical axis corresponds to a vertical axis in space which, however, is not mandatory. Positional references such as a bottom or top may refer to this vertical axis.

First referring to FIG. 2, the gearbox housing 10 has an exemplary box-like or cuboid shape. It has a front face 14 facing the viewer and a rear face 16 extending in parallel to but facing away from the front face 14. Further pairs of parallel faces are shown, one pair comprising a top face 18 and bottom face 20, another comprising two side faces 22. The front face 14 extends substantially orthogonal to the top and bottom face 18, 20 as well as to the side faces 22, whereas the side faces 22 extend substantially orthogonal to the top and bottom face 18, 20.

At the front face 14, an input shaft 24 is arranged which extends into the gearbox housing 10. The input shaft 24 can be driven by a mechanically connected device. A fan 26 is mounted on the input shaft 24 so as to jointly rotate therewith about an axis of rotation R. The fan 26 is configured to generate an airflow that contributes to the cooling of the gearbox 1. For example, the airflow generated by the fan 26 may flow along the gearbox housing 10.

In FIGS. 1 and 2, the input shaft 24 is depicted in a first position relative the gearbox housing 10 and generally assumes a first position within the gearbox 1. To that end, the gearbox housing 10 comprises a first predetermined section 29 for receiving the input shaft 24, said section 29 being concealed by the fan 26 in FIG. 2 and comprising a through hole for receiving the input shaft 24.

Yet, in the embodiment depicted here, the gearbox 1 and especially the gearbox housing 10 are configured to receive the shaft 24 also in a predetermined second position 30. A need to arrange the input shaft 24 at a specific one of the first and the second position may result from a specific inner configuration and/or number of gear stages of the gearbox 1. With the solution illustrated here, one and the same gearbox housing 10 can be used for both positions of the rotatable shaft 24. The second position of the input shaft 24 is indicated by a resulting alternative extension of the rotation axis R2 when the input shaft 24 is arranged in said second position.

Further, the location of the second predetermined section 30 in or at which the input shaft 24 can be received for arranging it in the second position is indicated in FIG. 2. Again, the second predetermined section 30 comprises a through-hole which, as in the embodiment depicted here, may be covered or blocked when not in use.

FIG. 2 also shows a number of spacers 32 at the front face 14. The fan cover assembly 12 and specifically its shielding member 40 and fan cover 42 discussed below are configured to be spaced apart from the front face 14 by said spacers 32. For example, the fan cover assembly 12 can be fixed to said spacers 32. To that end, the spacers 32 may comprise threaded portions, for example. The spacers 32 create a free space between the front face 14 and the fan cover assembly 12 which forms a channel for the airflow generated by the fan 26.

Referring to FIG. 1 in the following, the fan cover assembly 12 comprises the shielding member 40. Positions at which the shielding member 40 is fixed to the spacers 32 of FIG. 2 are indicated by bolt heads 44.

The shielding member 40 comprises an aperture 46 (herein referred to as second aperture 46) in which the fan cover 42 is received. The shielding member 40 has a front 100 extending substantially in parallel to the front face 14 of the gearbox housing 10. Further, the shielding member 40 comprises optional sections 102, 104 extending at an angle and typically orthogonally to the front 100. The number and orientation of said sections 102, 104 may vary.

An upper top section 104 extends along the top face 18 of the gearbox housing 10 but remains at a distance thereto. This creates an air gap or air channel, so that part of the airflow generated by the fan 26 is guided along said top face 18. This may locally increase cooling at the top face 18. In the example depicted here, this may contribute to the cooling of an input gear stage positioned close to the top face 18 within the gearbox housing 10 or, more precisely, to the cooling of oil that is present at and/or heated up by said input gear stage.

Differently put, the air that is guided over the top face 18 helps to indirectly cool down the oil inside the gearbox 1 by directly cooling down the gearbox housing 10. Typically, a thermal limit of the oil is a limiting factor of the power that the gearbox 1 may transmit. During operation, the oil inside the gearbox 1 often tends to accumulate around the fast spinning input gear stage. Thus, improving at least indirect cooling of the oil in this area may allow the maximum power which may be transmitted by the gearbox 1 to be increased.

The further angled section 102 equally creates air gap and guides part of the airflow along the adjacent side face 22 of the gearbox housing 10.

Figure 5:
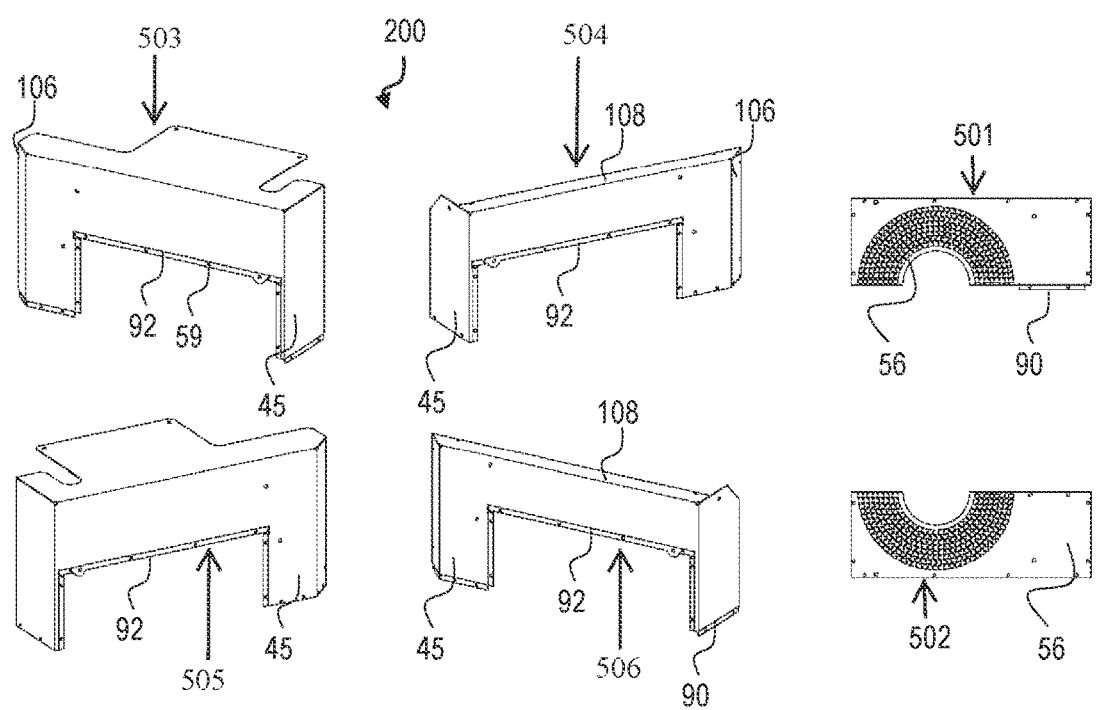
FIG. 5 shows an embodiment of the presently proposed modular set.

As a mere example, two further angled sections 106, 108 of the shielding member 40 are depicted (see also FIG. 5). These serve to reduce the gap between the front 100 of the shielding member 40 and the front face 14 of the gearbox housing 10. This promotes the air flow flowing or streaming through the dedicated air channels created by the sections 102, 104.

The sections 102, 104, 106, 108 may additionally shield the fan 26 from objects. For example, it is not possible to reach behind the front 100 from outside. As is further evident from the subsequent discussion of FIG. 5, the shielding member 42 comprises two shielding parts 45. These are connected to one another along an elongated linear joint 48. The connection is formed by rivets for which rivet holes 50 are provided in the shielding parts 45 (not all of which being marked with a reference sign in FIG. 1).

The fan cover 42 is a planar plate-shaped member whose outline matches the shape of the second aperture 46. It comprises an aperture 52 (herein referred to as first aperture 52) for receiving the input shaft 24 (see also FIGS. 3 and 4). The first aperture 52 is arranged at a center of a circular grid-like arrangement or pattern 54 of smaller apertures acting as vents. Air is drawn in by the fan 26 through said pattern 54.

The pattern 54 as well as the first aperture 52 are positioned off-center within the fan cover 40. That is, they are not concentrically arranged with respect to a geometric center positioned at half of the length L and half the height H of the fan cover 42, said geometric center not being specifically marked in FIG. 1.

Fixing the fan cover 42 and shielding member 40 to one another is discussed with reference to the subsequent figures in further detail.

In the embodiment depicted here, the fan cover 42 comprises two fan cover parts 56. These are joined to one another along a (second) linear joint 49. Again, this may be done by means of rivets for which rivet holes 50 are provided (not all of which being marked by reference signs). This linear joint 49 is aligned with the linear joint 48 along which the shielding parts 45 of the shielding member 40 are joined.

Figure 3:
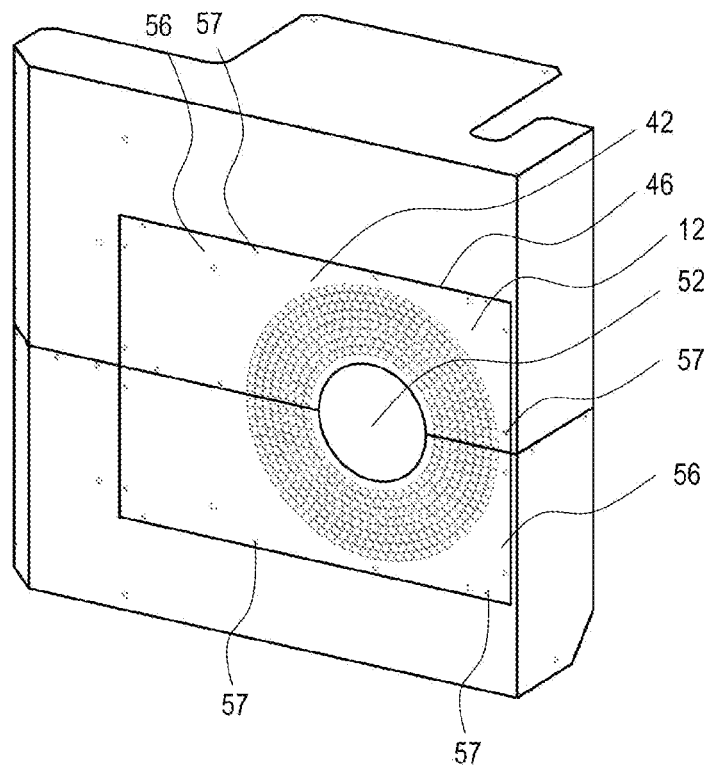
FIG. 3 shows the fan cover assembly of FIG. 1 with the fan cover having a first orientation.
Figure 4:
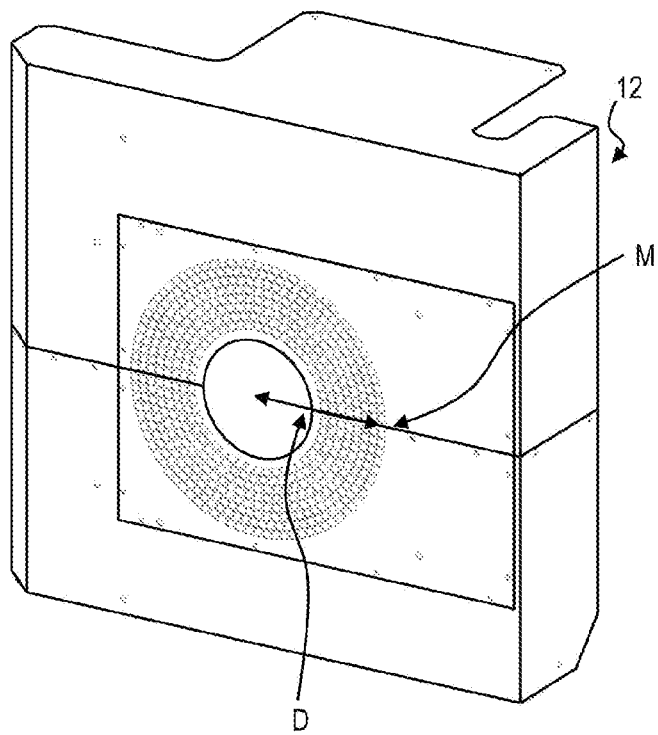
FIG. 4 shows the fan cover assembly of FIG. 1 with the fan cover having a second orientation.

FIGS. 3 and 4 show the fan cover assembly 42 of FIG. 1 in different configurations. In FIG. 3, the fan cover 12 is arranged and oriented within the second aperture 46 according to the configuration depicted in FIG. 1. The first aperture 52 of the fan cover 12 displaced to the right with respect to the (not specifically indicated) geometric center of the fan cover 12.

In FIG. 4, the fan cover 42 is arranged within the second aperture 46 with a second different orientation. In this case, the first aperture 52 is displaced with respect to the (not specifically indicated) geometric center of the fan cover 42 to the left. In FIG. 3, a former center of the first aperture 52 is indicated at position M. Further, a distance D between said position M and the current position of the center of the first aperture 52 is indicated. Said distance D may amount to several centimeters, e.g. between 3 cm and 25 cm.

As evident from FIGS. 3, 4, changing the orientation of the fan cover 42 also means that a position of the first aperture 52 changes relative to the shielding member 40.

In order to switch between the different orientations depicted in FIGS. 3 and 4, the fan cover 42 can be rotated in a clockwise or anti-clockwise direction. The respective rotational axis thus extends orthogonally to a plane of the fan cover 42 depicted in FIGS. 3, 4 and/or in parallel to the rotation axis R of FIG. 1. Alternatively, the fan cover 42 can be rotated or flipped about a vertical rotational axis extending within the plane of the FIGS. 3, 4.

By changing an orientation of the fan cover 42 as explained above, the input shaft 24 can be received within the first aperture 52 when said input shaft 24 is arranged in any of its possible positions explained with respect to FIG. 2 and indicated by means of the rotational axes R, R2 in said FIG. 2.

FIG. 3 also shows that the fan cover parts 56 comprise a number of fixing portions 57 (not each of which is marked by a respective reference sign). The fixing portions 57 are configured as through holes for receiving rivets in order to fix the fan cover 42 to the shielding member 40. The fixing portions 57 form a rotation-symmetrical arrangement. As a result and as evident from a comparison of FIG. 3 and FIG. 4, the arrangement of fixing portions 57 relative to the shielding member 40 does not change when altering the orientation of the fan cover 42. Differently put, regardless of said orientation, there are always fixing portions 57 at the same positions. Thus, corresponding fixing portions 59 (e.g. through holes for receiving rivets) of the shielding member 40, as discussed with respect to FIG. 5 below, can be used independently of the orientation of the fan cover 42. Specifically, these fixing portions 59 are always aligned with a fixing portion 57 of the fan cover 42 regardless of the fan cover's 42 orientation.

FIG. 5 shows a modular set 200 from which a plurality of possible fan cover assemblies 12 can be produced. Thus, depending on a currently provided gearbox 1, the components of said modular set 200 can be selected and combined to produce a fan cover assembly 12 whose dimensions and/or shape matches that of the gearbox 1. This includes for example selecting an orientation and/or position of the fan cover 12 so that its first aperture 52 matches a given position of the input shaft 24.

As a mere example, the modular set 200 comprises two fan cover parts 56 (for example, fan cover parts 501 and 502, as shown in FIG. 5) and four shielding parts 45 (for example, shielding parts 503, 504, 505, and 506, as shown in FIG. 5). Any two of the shielding parts 45 may be combined to form a shielding member 40. For example, shielding parts 503 and 504 may be combined to form a first shielding member, and shielding parts 505 and 506 may be combined to form a second shielding member, whereby the first shielding member and the second shielding member have different shapes and/or dimensions. Note that the orientation of the shielding parts 45 can be chosen differently from what is depicted in FIG. 5 (see different orientation of section 108 compared to section 108 in FIG. 1).

In FIG. 5, the above-mentioned section 108 of two of the shielding parts 45 can be seen particularly well. Further, connection sections 90 for connecting two shielding parts 45 are shown at some of the shielding parts 45. Said connection sections 90 from lower edge portions that are set back with respect to the front faces of the shielding parts 45. Thus, they slide behind a shielding part 45 with which a connection is supposed to be formed an e.g. contact a rear or inner side thereof. The connection sections 90 comprise though holes e.g. for receiving the previously discussed rivets.

As illustrated in the figures, at least one fan cover parts 56 may comprise a similar connection section 90 for connecting with the other fan cover part 56. The shielding parts 45 may also comprise set back connection sections 92 at the circumference of the second aperture 46. When the fan cover 42 is placed in said second aperture 46, it rests against these connection sections 92 and is typically flush with an outer front face of the shielding parts 45.

Further, said connection sections 92 comprise the fixing portions 49 that are aligned with the fixing portions 47 of the fan cover 42 when the latter is received in the second aperture 52 with any out of the possible plurality of orientations.

FIGS. 1-4 are drawn to scale, although other relative dimensions may be used. Further, FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like).

Further, elements shown intersecting one another may be referred to as intersecting elements or intersecting one another, in at least one example. Further still, an element shown within another element or shown outside of another element may be referred as such, in one example.

The invention claimed is:

1. A fan cover assembly for a gearbox, the gearbox having a rotatable shaft and a fan mounted on the rotatable shaft, the fan cover assembly comprising:
   a fan cover with a first aperture for receiving the rotatable shaft; and
   a shielding member with a second aperture for receiving the fan cover;
   wherein the fan cover is arrangeable in the second aperture with at least a first orientation defining a first position of the first aperture relative to the shielding member and with a second orientation defining a second position of the first aperture relative to the shielding member, and wherein the shielding member has a plurality of fixing portions that are configured to be aligned with fixing portions of the fan cover in both the first and second orientations of said fan cover.

2. The fan cover assembly of claim 1, wherein a distance (D) between the first position and the second position of the first aperture is at least 5 cm and/or wherein the first aperture is offset from a geometric center of the fan cover.

3. The fan cover assembly according to claim 1, wherein the fan cover comprises at least two fan cover parts that are connectable to one another, wherein when the at least two fan cover parts are connected to one another each fan cover part confines at least a section of the first aperture.

4. The fan cover assembly of claim 3, wherein the at least two fan cover parts are connectable to one another along an elongated and linear first joint.

5. The fan cover assembly according to claim 4, wherein the shielding member comprises at least two shielding parts that are connectable to one another, wherein when the at least two shielding parts are connected to one another each shielding part confines at least a section of the second aperture.

6. The fan cover assembly of claim 5, wherein the at least two shielding parts are connectable to one another along an elongated and linear second joint.

7. The fan cover assembly of claim 6, wherein the first and second joints are aligned with one another when the fan cover is arranged in the second aperture in both the first and second orientations of said fan cover.

8. The fan cover assembly according to claim 1, wherein the fan cover is rotatable about an axis of rotation for changing between the first and second orientations, and wherein the fixing portions of the fan cover are rotation-symmetrically arranged with respect to said axis of rotation.

9. A modular set for producing a fan cover assembly for a gearbox, the gearbox having a rotatable shaft and a fan mounted on the rotatable shaft, the fan cover assembly comprising:
   a fan cover with a first aperture for receiving the rotatable shaft; and
   a first shielding member and a second shielding member, each with a second aperture for receiving the fan cover;
   wherein the fan cover is arrangeable in the second aperture with at least a first orientation defining a first position of the first aperture and with a second orientation defining a second position of the first aperture, and wherein each of the first and second shielding members has a plurality of fixing portions that are configured to be aligned with fixing portions of the fan cover in both the first and second orientations of said fan cover,
   the modular set comprising the fan cover and at least the first shielding member and the second shielding member,
   wherein the first shielding member and the second shielding member have different shapes and/or dimensions.

10. An assembly, comprising:
    a gearbox housing that is configured to receive a rotatable shaft with a fan mounted on the rotatable shaft; and
    a fan cover assembly that includes:
      a fan cover with a first aperture for receiving the rotatable shaft; and
      a shielding member with a second aperture for receiving the fan cover;
    wherein the fan cover is arrangeable in the second aperture with at least a first orientation defining a first position of the first aperture relative to the shielding member and with a second orientation defining a second position of the first aperture relative to the shielding member, wherein the shielding member has a plurality of fixing portions that are configured to be aligned with fixing portions of the fan cover in both the first and second orientations of said fan cover, and wherein the fan cover assembly is coupled to the gearbox housing, and
    wherein the shielding member of the fan cover assembly comprises at least a first section and a second section that extend along different sides of the gearbox housing.

11. The assembly according to claim 10, wherein the gearbox housing comprises a first predetermined section for receiving the rotatable shaft to provide a first configuration of the assembly; and
    at least a second predetermined section for receiving the rotatable shaft to provide a second configuration of the assembly,
    wherein the second aperture of the shielding member covers an area of the gearbox housing including both of the first and second predetermined sections.

12. A method for producing a fan cover assembly for a gearbox, the gearbox having a rotatable shaft and a fan mounted on the rotatable shaft, the fan cover assembly comprising:
    a fan cover with a first aperture for receiving the rotatable shaft; and
    a shielding member with a second aperture for receiving the fan cover;
    wherein the fan cover is arrangeable in the second aperture with at least a first orientation defining a first position of the first aperture relative to the shielding member and with a second orientation defining a second position of the first aperture relative to the shielding member, and wherein the shielding member has a plurality of fixing portions that are configured to be aligned with fixing portions of the fan cover in both orientations of said fan cover,
    the method comprising:
      providing the fan cover with the first aperture for receiving the rotatable shaft;
      providing the shielding member with the second aperture for receiving the fan cover; and
      arranging the fan cover in the second aperture in the first or the second orientation.

* * * * *